(12) United States Patent
Gong et al.

(10) Patent No.: US 10,461,644 B1
(45) Date of Patent: Oct. 29, 2019

(54) SYNCHRONOUS RECTIFICATION SWITCH CONTROL WITH AUTOMATIC COMPENSATION AND RESET

(71) Applicant: Infineon Technologies Austria AG, Villach (AT)

(72) Inventors: Xiaowu Gong, Singapore (SG); Andrey Malinin, Fort Collins, CO (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/229,601

(22) Filed: Dec. 21, 2018

(51) Int. Cl.
*H02M 3/158* (2006.01)
*H02M 3/335* (2006.01)

(52) U.S. Cl.
CPC ....... *H02M 3/1588* (2013.01); *H02M 3/1582* (2013.01); *H02M 3/33576* (2013.01); *H02M 3/33592* (2013.01)

(58) Field of Classification Search
CPC ...................... H02M 3/33576; H02M 3/33592
USPC .......... 363/21.06, 21.1, 21.14, 21.18, 78, 79
See application file for complete search history.

(56) References Cited

U.S. PATENT DOCUMENTS

| | | | | |
|---|---|---|---|---|
| 2011/0096578 | A1* | 4/2011 | Fang | H02M 3/33592 363/127 |
| 2014/0204624 | A1* | 7/2014 | Djenguerian | H02M 3/33523 363/21.12 |
| 2015/0280573 | A1* | 10/2015 | Gong | H02M 3/33523 363/21.14 |
| 2016/0294292 | A1* | 10/2016 | Huang | H02M 1/44 |
| 2017/0117812 | A1* | 4/2017 | Furtner | H02M 3/33515 |

OTHER PUBLICATIONS

"TEA1792TS—GreenChip synchronous rectifier controller", NXP B.V., GreenChip, Product data sheet, Rev. 3, Jan. 29, 2014, accessed online at https://www.nxp.com/docs/en/data-sheet/TEA1792TS.pdf on Dec. 20, 2018.

* cited by examiner

*Primary Examiner* — Gary A Nash
(74) *Attorney, Agent, or Firm* — Murphy, Bilak & Homiller, PLLC

(57) ABSTRACT

Techniques are provided for controlling a synchronous rectification (SR) switch within a switched-mode power converter. The SR switch rectifies an output voltage of the power converter, and incurs little power loss in doing so. An SR controller generates control signals, including a turn-off trigger, that control conductivity of the SR switch. Voltages provided to the SR controller are divided down, so that the SR controller inputs do not need to support excessively high voltage levels as may be present in the power converter. The divided voltages are integrated to create a volt-second metric that closely tracks current through a winding of the power converter and the SR switch. The volt-second metric is compared against a threshold to determine when to issue an SR switch turn-off trigger.

20 Claims, 11 Drawing Sheets

SYNCHRONOUS RECTIFICATION SWITCH CONTROL WITH AUTOMATIC COMPENSATION AND RESET

TECHNICAL FIELD

The present application relates to control of a synchronous rectification (SR) switch within a switched-mode power converter and, in particular, provides techniques for using a volt-second metric across a winding to generate an SR switch turn-off trigger.

BACKGROUND

Isolated switched-mode direct-current (DC) to DC power converters use a transformer to convert power from an input source into power for an output load. Such power converters include one or more power switches that convert DC input power into alternating current (AC) power that is fed to the primary side of the transformer. AC power supplied on the secondary side of the transformer is rectified and filtered so as to provide DC power to the output load. Flyback converters represent a common type of isolated switched-mode power converter but other topologies, including forward, half bridge, and full bridge, may be used to generate AC power that is applied to the primary side of the transformer. These converters have a common requirement that the power generated on the secondary side of the transformer must be rectified before being provided to the output load.

A conventional technique for rectifying the secondary-side voltage is to use one or more diodes, so as to allow current to flow from the transformer secondary winding to the load, but not vice versa. Due to their higher efficiency, synchronous rectification (SR) switches are increasingly being used, as an alternative to diodes, to provide secondary-side rectification in switching power converters. More particularly, the voltage drop across an active SR switch is considerably smaller than the forward voltage drop across a diode, meaning that an SR switch consumes (wastes) less power than a diode and, relatedly, generates less heat, which must be dissipated. Unlike diodes, SR switches must be actively controlled, at least to achieve the desired high efficiencies. Hence, an SR controller is required to provide control signals to the SR switches, based upon power-stage control signals or secondary-side voltage or currents.

One technique for controlling an SR switch involves using variants of the control signals that are used for controlling power switches within the primary-side power stage. This technique have the disadvantage that it may require passing control signals across an isolation barrier, thereby necessitating undesirable isolators, e.g., opto-couplers. Furthermore, timing variations as the signals propagate to the SR switch often lead to sub-optimal timing of the SR switch, including difficulty in achieving zero current switching (ZCS), which is highly desired for efficient SR switching. For these and other reasons, many implementations prefer to locate an SR controller on the secondary side of an isolated switching power converter, and to base its operation upon voltages and/or currents sensed on the secondary side.

The voltage across and/or current through the SR switch may be used in controlling the SR switch. However, the voltages present across the SR switch (and the secondary winding of the transformer) often reach very high levels. The SR controller inputs must be capable of supporting such high voltage levels without damage, or must sense such voltages without direct connection. For example, a resistive voltage divider external to the SR controller may divide down such voltages before they are provided to the SR controller inputs. However, the SR controller must also be capable of sensing very small currents or voltages, e.g., around −10 mV, so that the SR switch may be turned off at zero current, or nearly so, to achieve good switching efficiency. This sensing must be done with considerable accuracy, e.g., 10 μV. Such highly accurate sensing typically runs counter to techniques for handling high voltages. For example, a secondary-side voltage toggling between 0V and 200V would require reduction before being provided to inputs of the SR controller. Such a reduced voltage would be quite susceptible to noise, e.g., from PCB trace coupling, and would not be measurable with the accuracy desired to achieve ZCS.

Circuits and methods are desired for withstanding the high voltage levels that may be produced at an SR switch of a switched-mode power converter, and for accurately sensing a low-level voltage of the SR switch for purposes of generating near-optimal SR switch control signals.

SUMMARY

According to an embodiment of a synchronous rectification (SR) controller, the SR controller is configured to control an SR switch of a switched-mode power converter having an output winding. The SR controller comprises first and second inputs, first and second voltage dividers, a volt-second determiner, and an SR switch turn-off signal generator. The first input is configured to sense a first voltage at a first terminal of the output winding, and the first voltage divider is configured to divide this first voltage, thereby providing a reduced first voltage. The second input is configured to sense a second voltage at a second terminal of the output winding, and the second voltage divider is configured to divide the second voltage, thereby providing a reduced second voltage. The volt-second determiner is configured to input the reduced first and second voltages, and provide a volt-second output based upon these reduced voltages. The resultant volt-second output tracks a winding current through the output winding. The SR switch turn-off signal generator is configured to generate an SR switch turn-off signal based upon the volt-second output and a first reference.

According to a method within a synchronous rectification (SR) controller of a switched-mode power converter having an output winding, the method is for controlling an SR switch that controls current flow through the output winding so as to rectify an output voltage of the power converter. The method comprises sensing a first voltage at a first terminal of the output winding, and dividing this first voltage to provide a reduced first voltage. The method further comprises sensing a second voltage at a second terminal of the output winding, and dividing this second voltage to provide a reduced second voltage. A difference between the reduced first and second voltages is integrated, thereby providing a volt-second output that corresponds to a current through the output winding. The volt-second output is compared against a first reference and, based upon this comparison, an SR switch turn-off signal is generated.

According to an embodiment of an isolated switched-mode power converter, the power converter comprises a transformer having primary and secondary windings, and which separates primary and secondary sides of the power converter. The power converter further comprises a synchronous rectification (SR) switch, and an SR controller for controlling conductivity of the SR switch. The SR switch is configured to rectify an output voltage of the secondary side by controlling current flow through the secondary winding. The SR controller comprises first and second inputs, first and second voltage dividers, a volt-second determiner, and an SR switch turn-off generator. The first input is for sensing an SR switch voltage at a first terminal of the SR switch, and the first voltage divider is for dividing this voltage, thereby providing a reduced SR switch voltage. The second input is for sensing the output voltage of the power converter, and the second voltage divider is for dividing this voltage, thereby providing a reduced output voltage. The volt-second determiner is configured to input the reduced SR switch and output voltages, and to provide a volt-second output based upon a difference between these reduced voltages. The resultant volt-second output corresponds to a current through the secondary winding. The SR switch turn-off signal generator is configured to generate an SR switch turn-off signal based upon the volt-second output and a first reference.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

Figure 1:
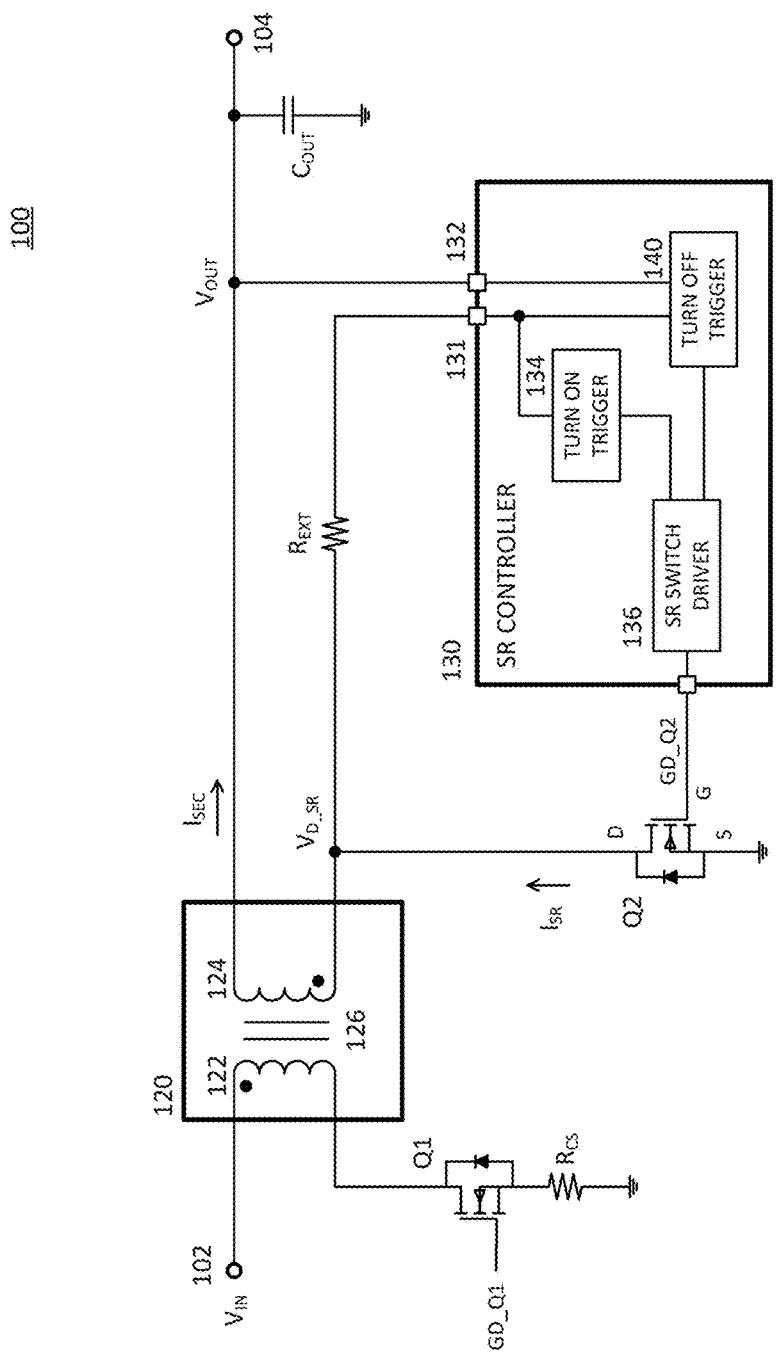
FIG. 1 illustrates a schematic diagram of an isolated flyback power converter including a synchronous rectification (SR) controller for controlling an SR switch.

The embodiments described herein provide techniques for controlling a synchronous rectification (SR) switch within a switched-mode power converter and, in particular, for triggering the turning off of such an SR switch. The techniques are primarily described in the context of an isolated flyback power converter, in which a power switch located on the primary side of a transformer controls power transfer through the power converter, and an SR switch located on the secondary side provides the rectification needed to provide direct current (DC) power to a load of the power converter. Though primarily described in the context of a flyback converter, the techniques are readily applied to other isolated switched-mode power converters, e.g., forward, half-bridge, full-bridge, and semi-resonant, provided that such converters use SR switches for rectification. The techniques may also be extrapolated for use in converters based upon tapped inductors and non-isolated switched-mode converters that use inductors for energy storage, e.g., buck, boost, and buck-boost converter, provided such converters use SR switches for rectification. For brevity of explanation, the SR switch control techniques are described below in the context of a particular power converter based upon an isolated flyback topology.

The primary-side power switch converts an input DC voltage into an AC voltage, which is applied across the primary winding of a transformer. This induces an AC voltage on a secondary winding of the transformer. The voltage level of the pulses generated on the secondary side is related to the voltage level of the primary-side pulses according to a turns ratio of the transformer. The resultant secondary-side AC voltage must be rectified and filtered, thereby providing a DC voltage that is stepped up or down relative to the DC voltage input to the power converter. One or more current-blocking devices provide rectification by allowing current to flow from the transformer secondary winding to the load and an output capacitor, but not allowing current flow in the opposite direction. During periods when there is no current flow (power transfer) from the secondary winding, power is provided from the output (filter) capacitor to the load.

Diodes may be used as the current-blocking devices. However, the forward voltage drop across a diode, e.g., 0.7V, leads to power loss and associated heat. Such power loss may be a significant portion of the power transfer for applications wherein the output voltage is relatively low, e.g., 2V, 3.3V. SR switches, such as metal-oxide semiconductor field-effect transistors (MOSFETs), may provide similar current-blocking capability, but with a much lower voltage drop and associated power loss. Due to such improved efficiency, SR switches are increasingly used in switched-mode power converters generally and, in particular, for power converters providing relatively low voltages. However, SR switches must be actively controlled. Such control may be provided, e.g., from a controller of the power converter that also controls the power transfer, or may be provided from a controller dedicated to control of the SR switch. Herein, the circuits and methods are described for a dedicated SR switch controller located on the secondary side of a power converter, but it should be appreciated that such an SR controller could be integrated within some other controller, e.g., a main controller of the power converter.

So as to minimize switching losses, the SR switch is preferably turned on when the voltage across it is zero or near zero, and is preferably turned off when the current through it is zero or near zero. An SR controller implementing such zero-voltage switching (ZVS) and/or zero-current switching (ZCS) typically generates control signals for the SR switch based upon secondary-side voltage and/or current measurements. Most current-sensing techniques rely, at some level, on measuring voltage, e.g., the drain-to-source voltage of a MOSFET may be measured and used, in conjunction with the MOSFET's on resistance ($R_{DS\_ON}$), to estimate current through the MOSFET. To achieve efficient turn-off switching, e.g., ZCS, low voltage levels typically must be sensed with a relatively high degree of accuracy, e.g., a threshold voltage of −10 mV may need to be detected with an accuracy of 10 µV.

The secondary-side voltage being sensed often reaches very high levels, e.g., up to 200V. This voltage may correspond to the voltage at the drain terminal of a MOSFET, and is related to the voltage across the secondary winding. Such high voltage levels present difficulties for sensing by the SR controller, which is preferably fabricated using low-cost digital or mixed signal process technologies that are not capable of inputting such high voltage levels without damage. While the voltage may be reduced before being provided to the SR controller, e.g., using a resistive voltage divider external to the SR controller, the reduced voltage is very susceptible to noise from the circuit board traces or other noise sources, which makes accurate sensing of low voltages impractical. Stated alternatively, the need to sense secondary-side voltages having high voltage levels and the need to accurately sense low voltage levels present goals that are largely conflicting.

The embodiments described below address these conflicting goals by providing techniques for handling high secondary-side voltage levels and for providing accurate sensing of low voltage levels. This is accomplished with minimal required components external to the SR controller. In a first embodiment, a volt-second metric is used to trigger the turn off of the SR switch. In a second embodiment, the volt-second metric is additionally reset so as to address inaccuracies, e.g., as caused by non-ideal component resistance/reactance, process variation, temperature-related variation. In a third embodiment, a resistive divider is enabled when needed to reduce a high voltage level, and is disabled when needed to accurately sense low voltage levels. In yet another embodiment, a feedback loop is used to dynamically adjust one of the resistive dividers, so as to achieve optimal body-diode conduction time for the SR switch.

It should be understood that the below examples are not meant to be limiting. Circuits and techniques that are well-known in the art are not described in detail, so as to avoid obscuring unique aspects of the invention. Features and aspects from the example embodiments may be combined or re-arranged, except where the context does not allow this.

The embodiments described below use a flyback converter topology and an SR switch on the ground side of the secondary winding of the transformer. It should be appreciated that the invention could be used in variants of the flyback converter topology described herein, as well as other isolated switched-mode power converter topologies. For example, the primary side could use a half bridge, full bridge, or LLC power stage. On the secondary side, the SR switch could be connected between the other terminal of the secondary winding and the output terminal of the power converter. The techniques described below may be used with other rectification topologies, e.g., a center-tapped secondary winding with SR switches on each outer leg, a current doubler, or a full-wave rectifier bridge.

Isolated Flyback Converter with Secondary-Side SR Switch Controller

FIG. 1 illustrates an isolated flyback switched-mode power converter 100 using a secondary-side SR switch Q2 for rectification, wherein turn-off of the SR switch Q2 uses a volt-second metric. The power converter 100 includes a DC input 102, an output 104, and a transformer 120, which provides galvanic isolation between primary and secondary sides of the power converter 100. The DC input 102 is for coupling to a DC power source having a voltage $V_{IN}$. In some implementations, the DC power source may be provided by a rectifier coupled to an AC power source, such as a mains supply. The output 104 is for coupling to a load, such as a processor, a battery charger, an electronic device, etc. (For ease of illustration, the DC power source and the load are not shown.)

On the primary side of the power converter 100, a power switch Q1 controls the power transfer through the power converter 100 according to a gate drive signal GD_Q1. A driver generates the gate drive signal GD_Q1 based upon a control signal from a controller. (For ease of illustration, the driver and controller are not shown.) The controller is responsible for controlling the power converter 100 so as to supply necessary power to the load. A typical controller senses the output voltage $V_{OUT}$, e.g., using an isolator such as an opto-coupler (which is not shown for ease of illustration), and uses this measurement to generate the gate drive signal GD_Q1. The typical controller uses linear feedback control techniques, such as proportional-integral-derivative (PID) control, for regulating the output voltage $V_{OUT}$. For example, the control signal provided by the controller may be a fixed-frequency pulse-width-modulated (PWM) signal, and a PID controller may provide the duty cycle of the PWM signal. Alternatively, a fixed duty cycle may be used, and the PID controller may provide the frequency of the PWM signal. These and other techniques are well known within the field of feedback control and are not crucial for understanding the unique aspects of the SR switch control described herein. Hence, further detail regarding control techniques for the power switch Q1 is not provided.

A current-sense resistor $R_{CS}$ may be used by the controller to measure the current flow through the power switch Q1, so as to augment any linear control with, e.g., feedforward control techniques. While not illustrated, many versions of a flyback converter include a snubber circuit across the primary winding of the transformer. As described previously, other primary-side topologies may similarly be used to generate the AC voltage that is input to the transformer 120.

The transformer 120 includes a primary winding 122 having N1 turns, a secondary winding 124 having N2 turns, and a core 126. The transformer provides a voltage step down (or step up) according to the turns ratio N1:N2.

The secondary side of the power converter 100 includes an output capacitor $C_{OUT}$, the output 104, the SR switch Q2, and an SR controller 130. The output capacitor $C_{OUT}$ filters the voltage pulses provided by the secondary winding 124 and the SR switch Q2, thereby providing a relatively constant voltage $V_{OUT}$ at the output 104. During intervals when the SR switch Q2 is not conducting, the output capacitor $C_{OUT}$ supplies current to the load, whereas the output capacitor $C_{OUT}$ is charged when the SR switch Q2 is conducting. The SR switch Q2 switchably connects one side of the secondary winding 124 to ground, thereby rectifying the voltage $V_{OUT}$ provided at the output 104. The SR switch Q2 illustrated in FIG. 1 is an enhancement-mode metal-oxide semiconductor field-effect transistor (MOSFET), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. Note that the SR switch Q2 could be located on the $V_{OUT}$ side of the secondary winding 124 rather than on the ground side as illustrated. The illustrated configuration is preferred in many applications, as the gate drive signal GD_Q2 for the SR switch Q2 may be referenced to ground, which simplifies the drive circuitry used for generating the gate drive signal GD_Q2.

The SR controller 130 senses a drain voltage $V_{D\_SR}$ of the SR switch Q2 via an external resistor $R_{EXT}$ and a first input 131, and senses the output voltage $V_{OUT}$ via a second input 132. The SR controller 130 includes a turn-on trigger circuit 134 and a turn-off trigger circuit 140. These circuits 134, 140 provide turn-on and turn-off trigger signals to an SR switch driver 136, which generates the gate drive control signal GD_Q2 used to control conduction of the SR switch Q2. The turn-on trigger circuit 134 typically compares the drain voltage $V_{D\_SR}$, or a reduced version thereof, against a turn-on threshold voltage $V_{THR\_ON}$ to determine when to turn on the SR switch Q2. (A voltage divider within the SR controller 130 may reduce the voltage $V_{D\_SR}$ before such comparison. Such a voltage divider may be within the turn-on trigger circuit 134, or may use a resistive voltage divider common to the trigger circuits 134, 140, e.g., the voltage $V_{OUT\_DIV}$ shown in FIG. 2 may also be used by the turn-on trigger circuit 134.) The turn-on threshold voltage $V_{THR\_ON}$ does not need to be detected with great accuracy. The SR switch driver generates PWM control signals, e.g., 5V to turn on the SR switch Q2 and 0V to turn off the SR switch Q2 for a typical enhancement-mode n-channel power MOSFET. Because such turn-on comparison circuits and SR switch drivers are well-known, these circuits are not described further. Embodiments of the turn-off trigger circuit 140, however, are described in further detail below.

Turn-Off Trigger Based on Volt-Second Metric

Figure 2:
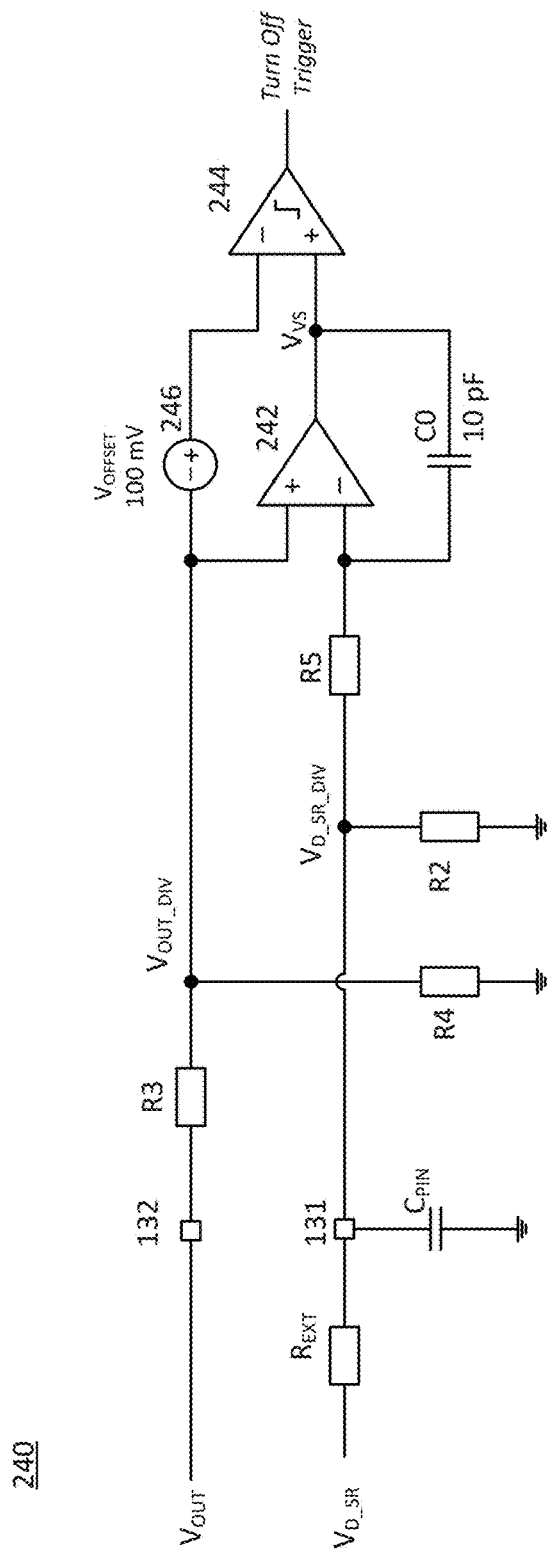
FIG. 2 illustrates a schematic diagram of a first turn-off trigger circuit, which is part of an SR controller

FIG. 2 illustrates an embodiment of a turn-off trigger circuit 240. The turn-off trigger circuit 240 uses a volt-second metric and associated threshold for determining when to trigger the turning off of the SR switch Q2. The volt-second metric effectively provides a good estimation of the current $I_{SEC}$ through the secondary winding 124 of the transformer 120, without requiring that low voltage or current levels be directly sensed with high accuracy. This is the same type of volt-second metric that may be used for monitoring magnetic flux within the transformer 120. The volt-second metric should be balanced, as should the magnetic flux, over the interval of one switching cycle of the power converter 100. The turn-off trigger circuit 240 comprises two resistive voltage dividers, an amplifier 242 configured to track the volt-second metric, a voltage offset 246, and a comparator 244.

The turn-off trigger circuit 240 uses the external resistor $R_{EXT}$ and an internal resistor R2 to divide a voltage $V_{D\_SR}$ at a drain terminal of the SR switch, thereby producing the reduced voltage $V_{D\_SR\_DIV}$. The divisor ratio and resistances of $R_{EXT}$ and R2 are chosen to divide a maximum expected voltage of the drain voltage $V_{D\_SR}$ to an allowable voltage level for the first input 131. The capacitor $C_{PIN}$ filters this input voltage $V_{D\_SR\_DIV}$ to remove high-frequency components, e.g., noise. Internal resistors R3, R4 are used to divide the output voltage $V_{OUT}$ of the voltage converter 100, thereby producing the reduced voltage $V_{OUT\_DIV}$ at an acceptable voltage level for the second input 132.

The amplifier 242, in combination with the capacitor C0 and the resistor R5, integrates a difference between a voltage corresponding to the output voltage $V_{OUT}$, and a voltage corresponding to the drain voltage $V_{D\_SR}$. For appropriately-matched voltage dividers provided by the external resistor $R_{EXT}$ and the internal resistors R2, R3, R4, the voltage difference being integrated corresponds to the voltage across the secondary winding 124 of the transformer 120, i.e., $$V_{VS} = \frac{1}{R5*C0}\int\left(\frac{1}{\alpha_1}V_{D\_SR} - \frac{1}{\alpha_2}V_{OUT}\right)dt,$$

where the terms $1/\alpha_1$ and $1/\alpha_2$ account for the voltage division and, if the voltage division is matched, are the same. The resultant volt-second metric $V_{VS}$ is output from the amplifier 242 (integrator) and compared against a threshold voltage ($V_{OUT\_DIV}+V_{OFFSET}$), where $V_{OUT\_DIV}$ also serves as the reference voltage in the integration performed by the amplifier 242. The offset voltage $V_{OFFSET}$, which is set to 100 mV in the illustrated circuit, is provided by a voltage source 246 and is included so that the volt-second metric does not need to fall all the way to 0V. Generating a turn-off trigger prior to the volt second metric $V_{VS}$ falling all the way to 0V, which corresponds to no current through the SR switch Q2, allows for an appropriate propagation time from initial detection by the comparator 244 until the SR switch Q2 actually turns off. This, in turn, provides SR switch turn-off timing that is closer to ideal ZCS than might otherwise be possible. (Without the voltage offset $V_{OFFSET}$, propagation delays would lead to the SR switch Q2 turning off after the ideal zero-current point is reached.) Additionally, component or other inaccuracies may prevent the volt-second metric $V_{VS}$ from reaching 0V, as is ideally expected. A comparator 244 compares the volt second metric $V_{VS}$ against the threshold voltage ($V_{OUT\_DIV}+V_{OFFSET}$), and generates a turn-off trigger signal as shown in FIG. 2.

Figure 3:
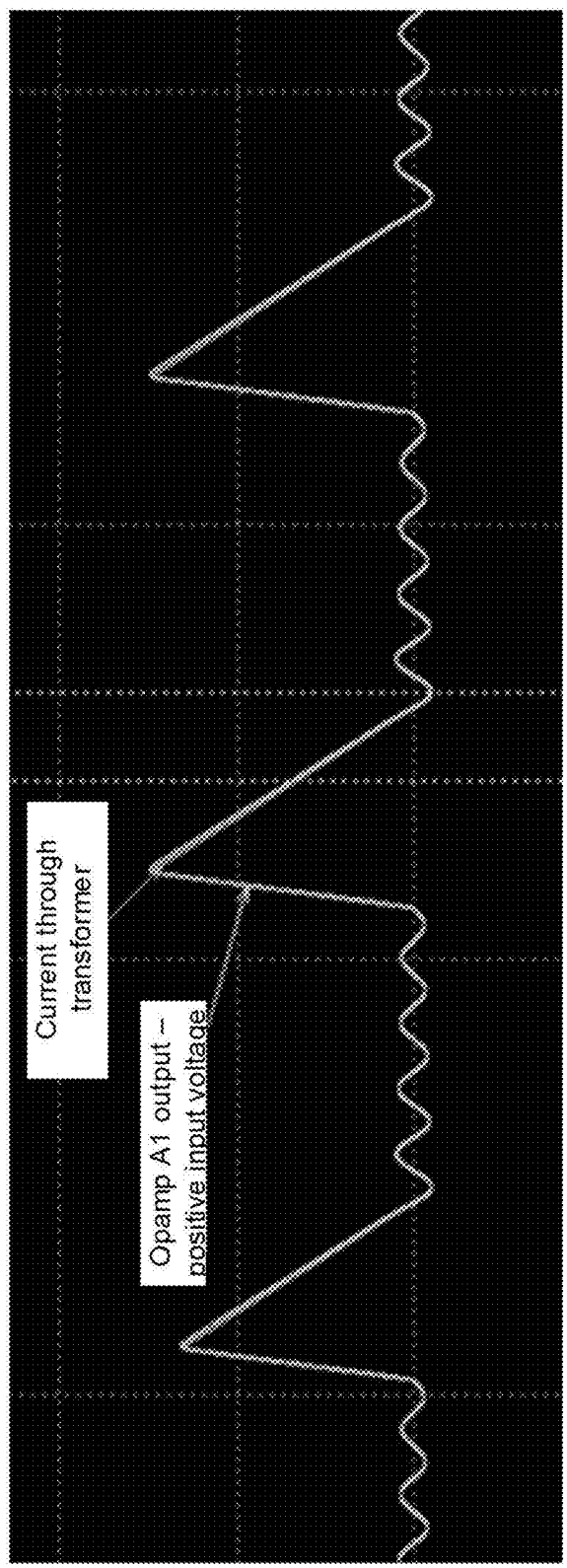
FIG. 3 illustrates waveforms showing that a volt-second metric may be used to closely approximate current through a secondary winding of a transformer within a converter.

FIG. 3 illustrates waveforms 300 corresponding to the volt-second metric $V_{VS}$ that is output from the amplifier 242 and to a current $I_{SEC}$ flowing through the transformer secondary winding 124, as determined from a simulation of the turn-off trigger circuit 240. Note that the volt-second metric $V_{VS}$ approximates the current $I_{SR}$ so closely that these waveforms are nearly indistinguishable.

Reset of Volt-Second Metric

The description provided above presumes no variation in circuit components, e.g., that the voltage dividers are matched and do not vary. In practical implementations, the resistors comprising the voltage dividers, including, particularly, the resistors R2, R3, R4 within the turn-off trigger circuit 240 and the SR controller 130, will have some process tolerance such that their respective resistances vary from ideal values. Furthermore, these resistances are temperature dependent, and will vary as the temperature of the turn-off trigger circuit 240 varies. The temperature dependence and the temperature itself of the internal resistors R2, R3, R4 will differ from those of the external resistor $R_{EXT}$. Yet further, parasitic impedances within the turn-off trigger circuit will lead to additional variance. Due to such inaccuracies, the volt-second metric $V_{VS}$ will not be perfectly balanced, even if the magnetic flux of the secondary winding 124 is balanced, and the volt-second metric $V_{VS}$ will drift over the long term, e.g., over several switching cycles of the power converter 100. Such drift will lead to increasing inaccuracy for timing of the turn-off trigger. For example, the trigger may, over time, drift to occur too early or too late, such that ZCS is not achieved.

Figure 4:
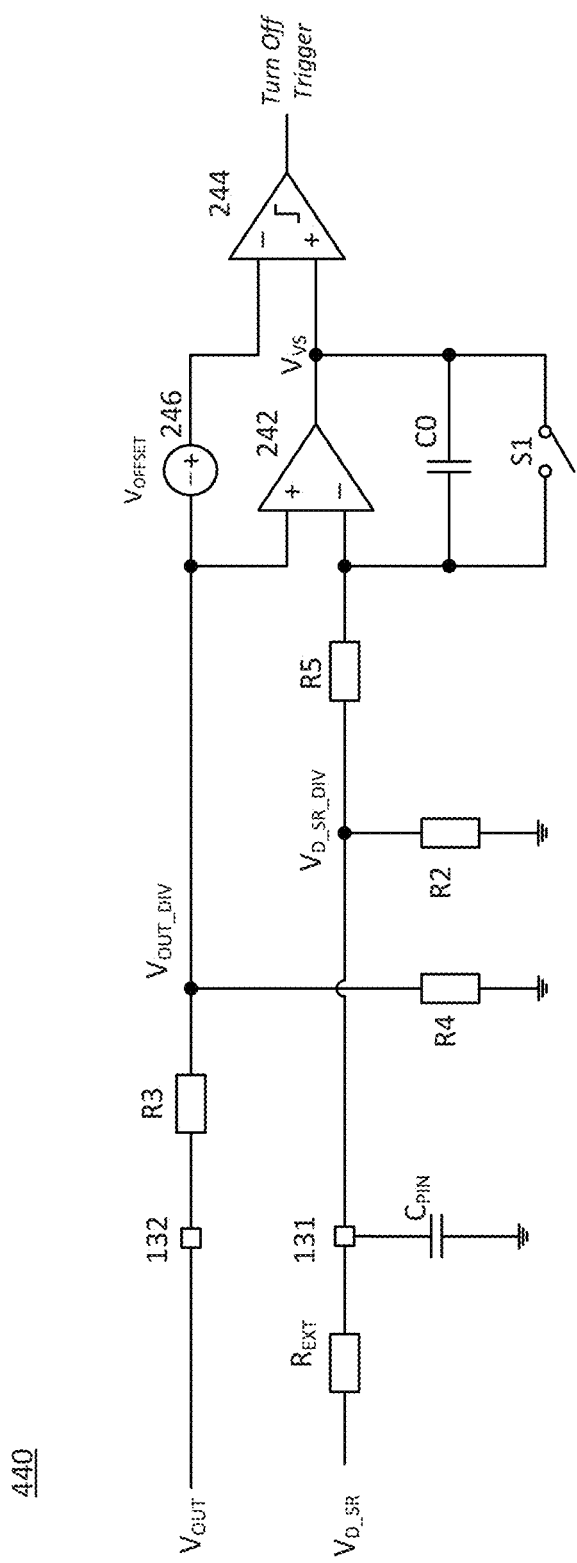
FIG. 4 illustrates a schematic diagram of a second turn-off trigger circuit, which includes a reset switch for clearing a volt-second metric for each switching cycle of a converter.

FIG. 4 illustrates a turn-off trigger circuit 440 for addressing this problem. Relative to the turn-off trigger circuit 240 of FIG. 2, the turn-off trigger circuit 440 has a reset switch S1, which is used to clear (reset) the volt-second metric $V_{VS}$ accumulated by the amplifier 242. The reset switch S1 is preferably toggled when the current $I_{SR}$ through the SR switch Q2 and the secondary winding 124 is zero, which corresponds to the beginning of a switching cycle of the voltage converter 100. By clearing the volt-second metric $V_{VS}$ for each switching cycle of the power converter 100, the volt-second metric $V_{VS}$ is prevented from accumulating/drifting over the long term due to component variance or other inaccuracies.

Figure 5:
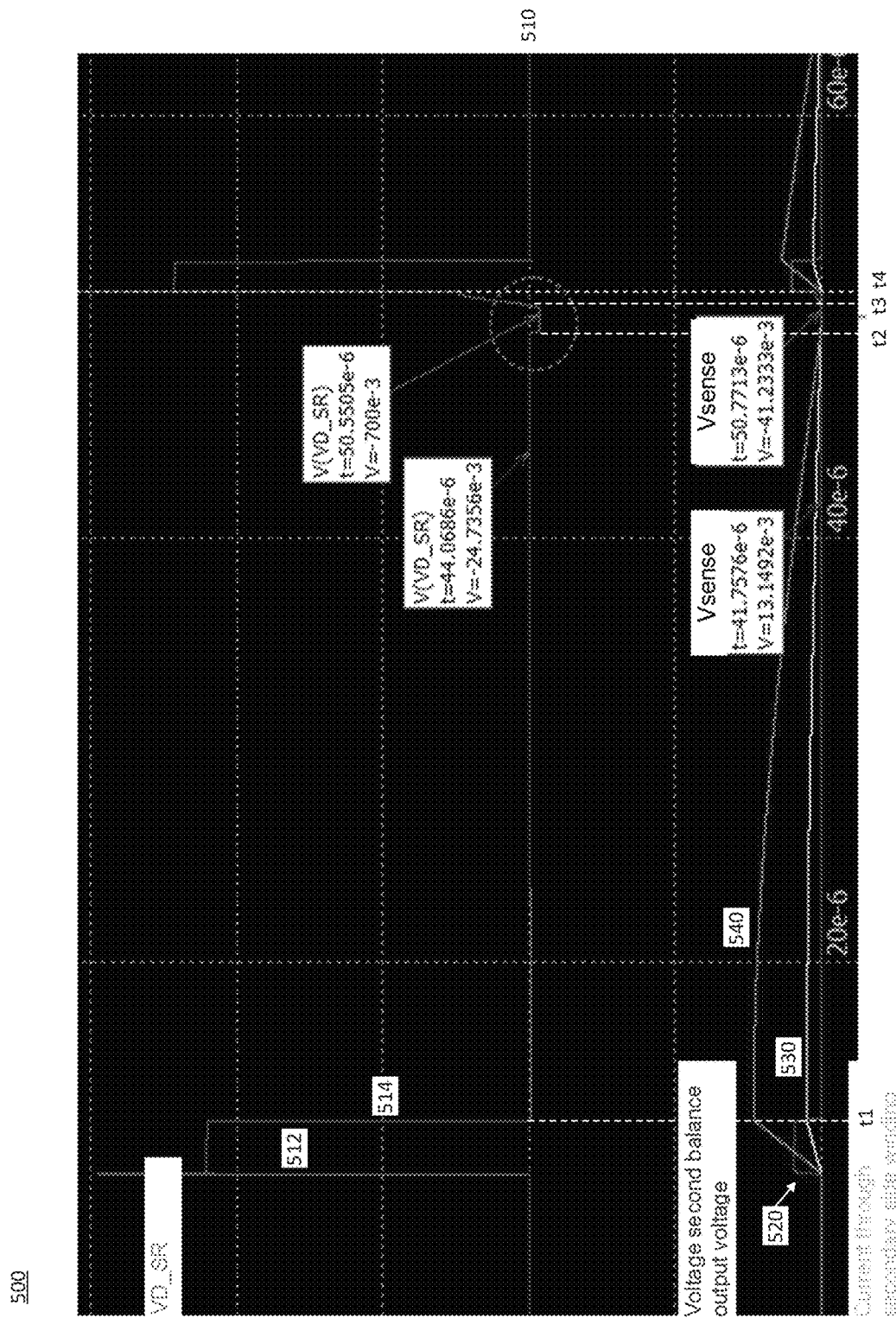
FIG. 5 illustrates voltage and current waveforms corresponding to the circuit of FIG. 4.

FIG. 5 illustrates waveforms 500 corresponding to the turn-off trigger circuits 240, 440 of FIGS. 2 and 4. A first waveform 510 corresponds to the voltage $V_{D\_SR}$ at the drain terminal of the SR switch Q2. A first pulse 512 of this waveform corresponds to a power interval during which power is transferred to the primary-side winding 122 and during which the SR switch Q2 is off (not conducting). At the end of the power interval, which is denoted as time t1 in FIG. 5, the voltage $V_{D\_SR}$ falls 514, and the SR switch Q2 is turned on (set to conduct), e.g., as signaled by the turn-on trigger circuit 134. Beginning at time t1, a decreasing current $I_{SEC}$ flows through the secondary winding 124 and the SR switch Q2, in the direction illustrated in FIG. 1, i.e., from ground to the secondary winding 124. In conjunction with the on resistance of the SR switch Q2, the SR current $I_{SR}$ generates a voltage drop from the source (S) to the drain (D) of the SR switch Q2, thereby resulting in a negative voltage at the drain, i.e., $V_{D\_SR}$ is negative. Because the on resistance is small for a power switch such as the SR switch Q2, this negative voltage for $V_{D\_SR}$ has a relatively small magnitude, e.g., −100 mV. The current $I_{SR}$ decreases from time t1 to time t2 and, correspondingly, the magnitude of the drain voltage $V_{D\_SR}$ also decreases. (Because the drain voltage $V_{D\_SR}$ is negative during this interval, the signed voltage $V_{D\_SR}$ increases.) This can be seen at the marker corresponding to time t=44 μsec, where the voltage $V_{D\_SR}$ has increased to about −25 mV. (The voltage magnitude has decreased.)

A second waveform 520 corresponds to a divided version $V_{D\_SR\_DIV}$ (Vsense) of the drain voltage $V_{D\_SR}$. For example, the voltage divider comprised of $R_{EXT}$ and R2 in FIG. 2 may reduce the drain voltage by 17, such that $V_{D\_SR\_DIV}=(V_{D\_SR})/17$. It is this divided voltage $V_{D\_SR\_DIV}$ that is being input to the integrator made up of the amplifier 242.

A third waveform 530 corresponds to the current $I_{SEC}$ through the secondary winding 124 of the transformer 120. During the power interval 512, a magnetizing inductance of the transformer 120 causes this current to increase. After the SR switch Q2 is turned on (set to conduct), the current $I_{SEC}$ and the current $I_{SR}$ gradually decrease as energy is transferred to the output 104 and an attached load.

A fourth waveform 540 corresponds to the volt-second metric $V_{VS}$. As with the transformer current $I_{SEC}$, this metric $V_{VS}$ increases during the power interval 512, and decreases thereafter as energy is transferred from the transformer 120 to the load. This decrease continues until the metric $V_{VS}$ reaches the turn-off trigger threshold and the comparator 244 issues a turn-off trigger signal, which occurs at time t2.

Upon turning off the SR switch Q2 at time t2, the inductance of the secondary winding 124 causes a continued current flow from ground via the body diode of SR switch Q2. Rather than the relatively low voltage drop incurred by the SR switch Q2 when the switch is turned on, conduction via the body diode incurs a source-to-drain voltage drop of about 0.7V typically. This can be seen in the waveform 510 of the drain voltage $V_{D\_SR}$ between times t2 and t3, which is referred to hereafter as the body diode conduction interval.

At time t3, the body diode conduction interval ends when the SR switch current $I_{SR}$ stops (i.e., becomes 0). It is at this time instant t3 that the volt-second metric $V_{VS}$ is preferably reset using the switch S1. For example, the switch S1 may be closed at some time instant after the SR switch Q2 is turned off at time t2, and is subsequently opened at time t3. Thus, the volt-second metric $V_{VS}$ begins a new accumulation (integration) starting at time t3. After time t3, the drain voltage $V_{D\_SR}$ slowly rises until time t4, when the next power interval starts and the voltage $V_{D\_SR}$ spikes upwards.

Disabling of Voltage Divider

The body diode conduction has a preferred duration, e.g., 200 ns, such that the SR switch is turned off when nearly zero current is flowing through it, i.e., ZCS is achieved, and such that it is ensured that no current $I_{SR}$ is flowing through the SR switch, including its body diode, when the next power interval begins. Achieving such an ideal body diode conduction duration necessitates, typically, measuring the duration between times t2 and t3, which further involves detecting time instant t3 when the SR current $I_{SR}$ reaches zero. Such a time instant t3 may also be detected using the voltage $V_{D\_SR}$, which rises above the diode forward voltage (e.g., 0.7V), e.g., by comparing a voltage corresponding to $V_{D\_SR}$ against a threshold voltage near 0V. However, the reduced drain voltage $V_{D\_SR}$, as available within the turn-off trigger circuits 240, 440 of FIGS. 2 and 4, has such a low magnitude that consistently detecting such a threshold is not feasible due, e.g., to noise.

Figure 6:
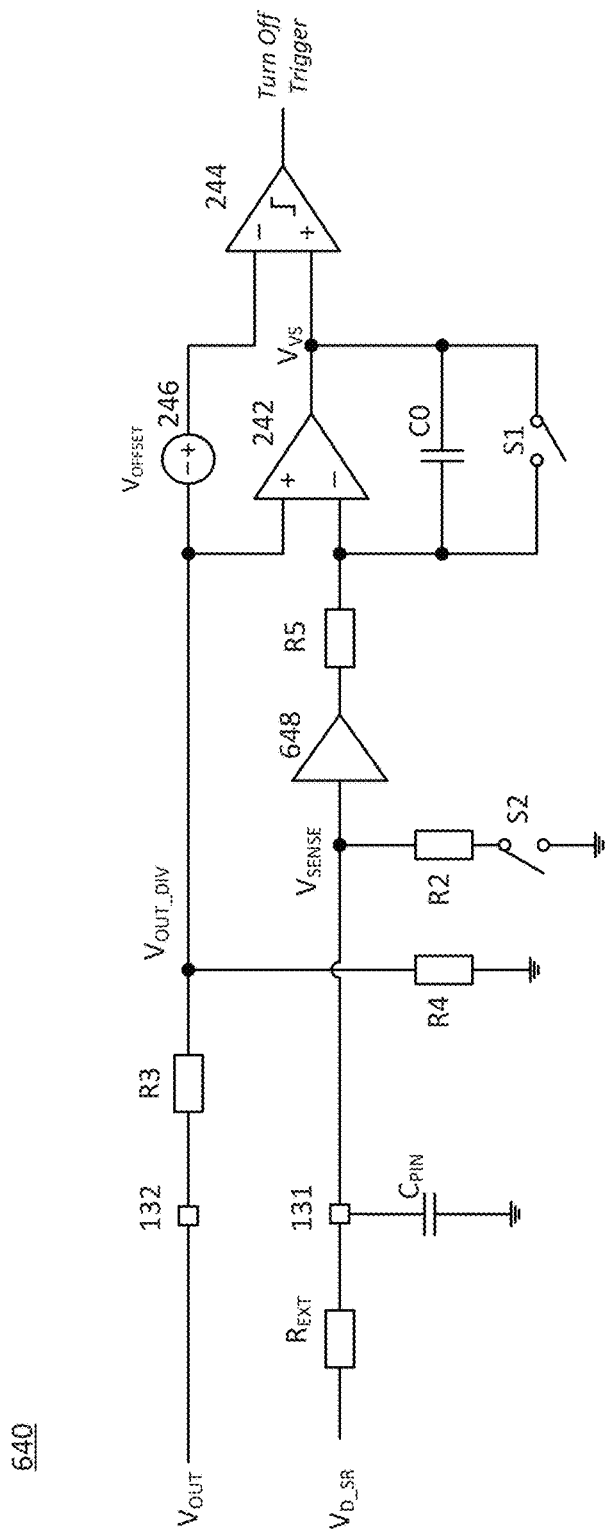
FIG. 6 illustrates a schematic diagram of a third turn-off trigger circuit, which includes a switch for disabling a voltage divider, so as to be able to more accurately detect voltage across an SR switch.

FIG. 6 illustrates a turn-off trigger circuit 640 that addresses this problem by disabling the voltage divider coupled to the first input 131, i.e., the voltage divider comprising resistors $R_{EXT}$ and R2. Relative to the previously-described turn-off trigger circuits 240, 440, this turn-off trigger circuit 640 also includes a second switch S2 and a buffer 648. The second switch S2 is opened coincident with the SR switch Q2 being turned off, e.g., at time instant t2 in FIG. 5 when the turn-off trigger signal is asserted by the comparator 244. With the voltage divider for the drain voltage $V_{D\_SR}$ disabled thusly, it may be more easily (and consistently) detected when the voltage $V_{SENSE}$ at the first input 131 increases from the body diode forward voltage of the SR switch Q2, e.g., $V_{D\_SR}=-0.7V$, to a voltage of 0V, or nearly 0V. For example, a comparator may be connected to the first input 131, so that the voltage $V_{SENSE}$ may be compared against some threshold voltage, e.g., 0V or −0.1V, so as to detect the time instant t3 of FIG. 5.

Figure 7:
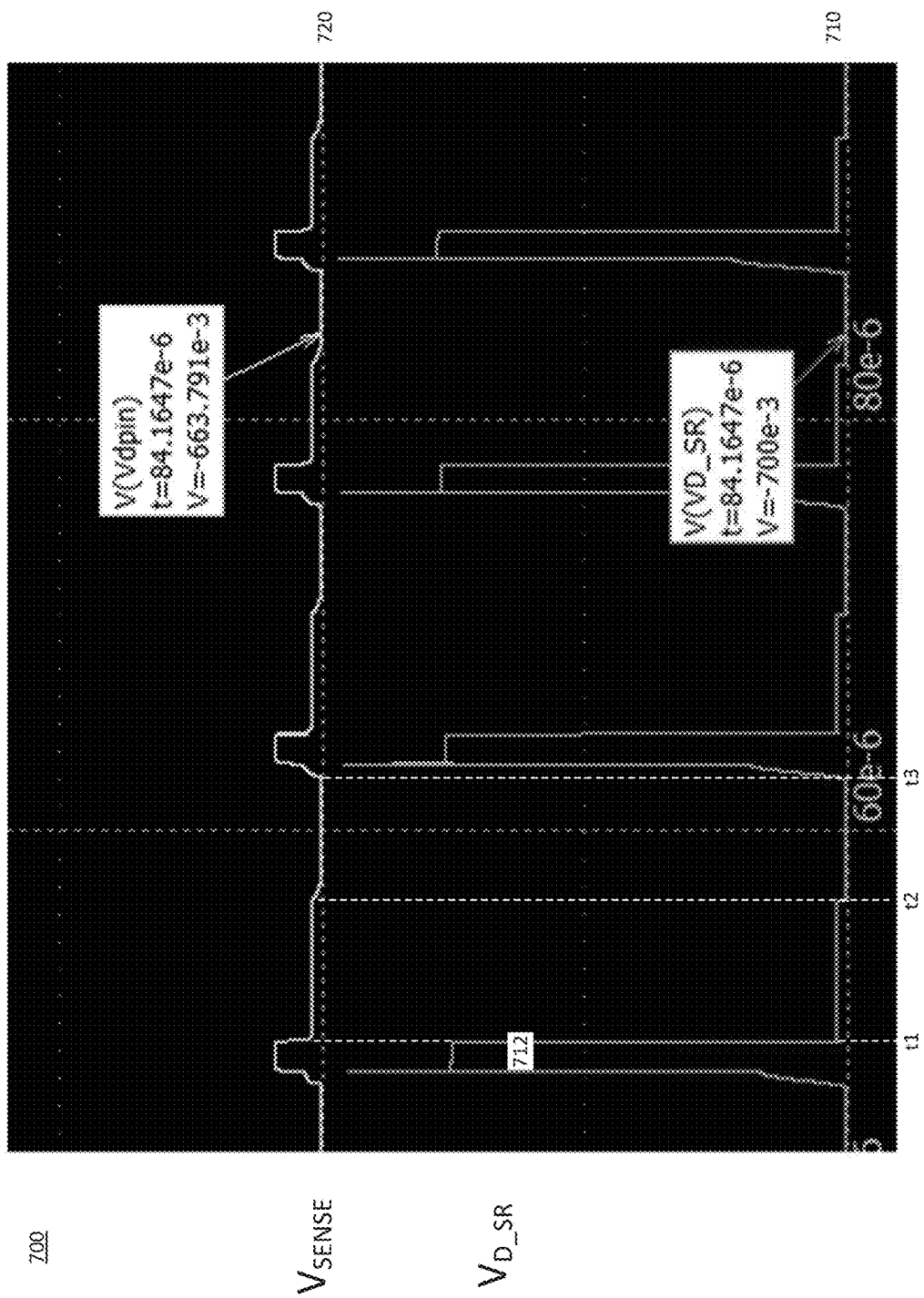
FIG. 7 illustrates voltage and current waveforms corresponding to the circuit of FIG. 6.

FIG. 7 illustrates waveforms 700 corresponding to the turn-off trigger circuit 640 of FIG. 6. A first waveform 710 corresponds to the voltage $V_{D\_SR}$ at the drain terminal of the SR switch Q2, and is similar to the first waveform 510 of FIG. 5. As illustrated, a voltage pulse 712 corresponds to a power interval during which voltage is applied on the primary side of the transformer 120. Between times t1 and t2, the SR switch Q2 is turned on (conducts) and has a relatively low resistance such that the voltage $V_{D\_SR}$ is negative with a small magnitude. The SR switch Q2 is turned off at time t2, but current conduction continues via the body diode of the SR switch Q2 until time t3. During this interval, the voltage $V_{D\_SR}$ is negative, but has a larger magnitude corresponding to the body diode voltage drop, e.g., $V_{D\_SR}=-0.7V$.

A second waveform 720 corresponds to a voltage $V_{SENSE}$ at the first input 131. During the interval including the power interval 712 and through time t2 when the SR switch Q2 is turned off, the switch S2 is closed such that the sensed voltage $V_{SENSE}$ corresponds to a divided version of the drain voltage $V_{D\_SR}$. At time t2, the switch S2 is opened, thereby removing the voltage divider from the first input 131 such that the unreduced voltage $V_{D\_SR}$ is available, i.e., voltage $V_{SENSE}=V_{D\_SR}$, during the interval between times t2 and t3. (This corresponds to the body diode conduction interval, during which $V_{D\_SR}$ is determined from the body diode's forward voltage, e.g., $V_{D\_SR}=-0.7V$.) At time t3, the second switch S2 is closed, such that the reduced voltage is provided to amplifier 242 for integration. After time t2 and before the time t3, the unreduced voltage $V_{SENSE}$, may be compared against a threshold and, based upon the time difference t3−t2, the body diode conduction interval may be adjusted towards an optimal conduction interval for future switching cycles.

Adjustment of Diode Conduction Interval

Figure 8:
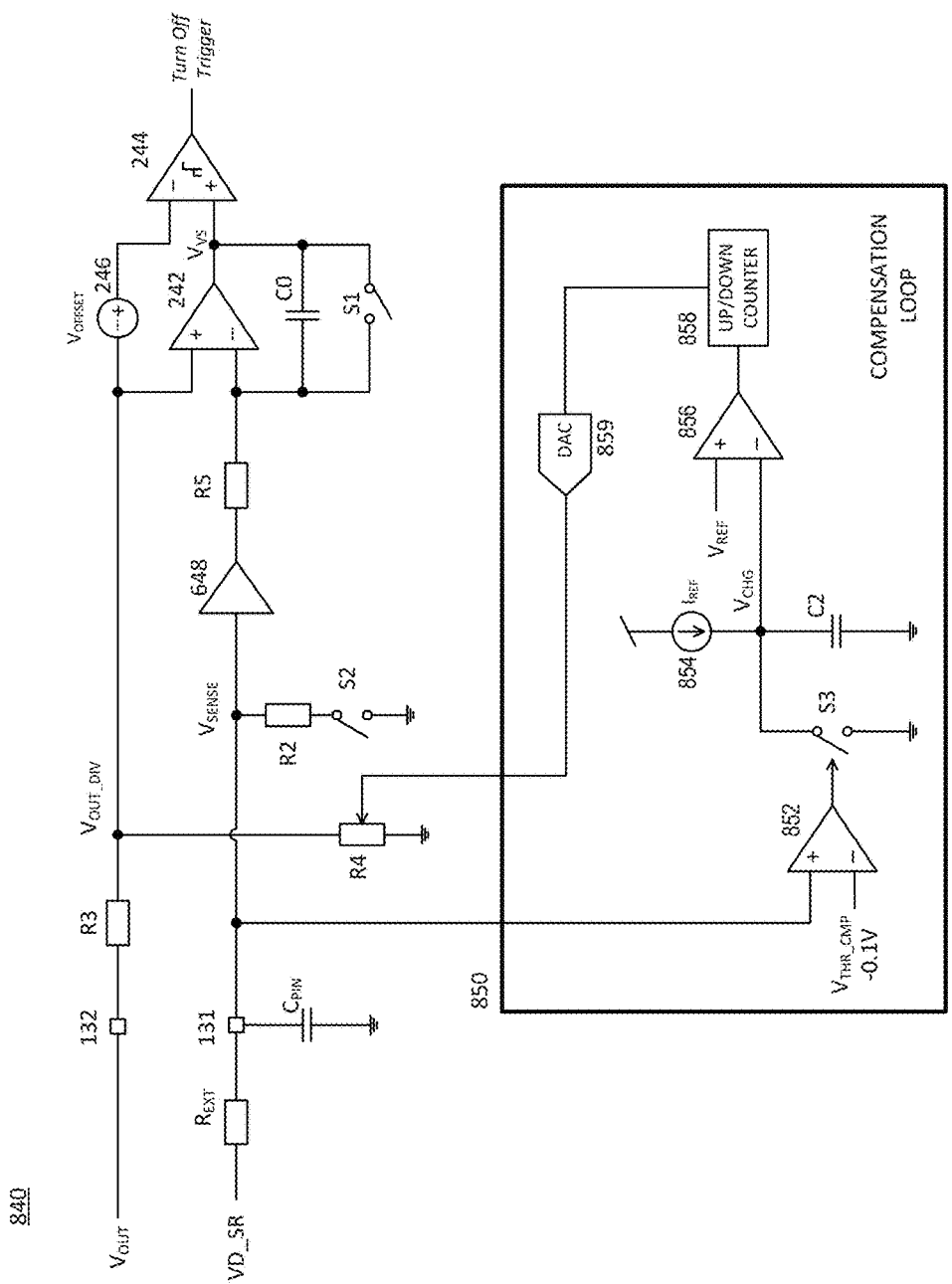
FIG. 8 illustrates a schematic diagram of a fourth turn-off trigger circuit, which includes a compensation circuit for adjusting a body diode conduction interval to match a desired interval.

FIG. 8 illustrates a turn-off trigger circuit 800 that includes a body diode conduction interval compensation loop 850. This compensation loop 850 provides an adjustment to the body diode conduction interval for each switching cycle of the power converter 100. The adjustment is implemented by altering the voltage division for the output voltage $V_{OUT}$ that is provided at the second input 132. More particularly, the resistor R4 of the compensation loop 850 is a variable resistor whose value may be adjusted so as to modify the reference voltage $V_{OUT\_DIV}$ that is input to the amplifier 242 and, indirectly, to the comparator 244. Note that other techniques for adjusting the body conduction interval may be preferred in other applications. For example, the resistor R3 may be converted to a variable resistor and modified. The compensation loop 850 includes a digital-to-analog converter (DAC) 859 for controlling the variable resistor R4, an up/down counter 858, a time comparator 856, a charge pump, and a first comparator 852.

The first comparator 852 compares the voltage $V_{SENSE}$ at input 131 against a threshold $V_{THR\_CMP}=-0.1V$. When the voltage $V_{SENSE}$ is above −0.1V, as occurs during the power interval and when the SR switch Q2 is turned on, the comparator 852 holds the charge-pump switch S3 closed such that a charge voltage $V_{CHG}$ is zero. During the body diode conduction interval, e.g., between times t2 and t3 as illustrated in FIG. 7, the voltage $V_{SENSE}$ falls below the threshold $V_{THR\_CMP}=-0.1V$ (e.g., $V_{SENSE}=-0.7V$). During this interval, the first comparator 852 opens the charge-pump switch S3, which allows a charge-pump current source 854 to charge a charge-pump capacitor C2. A charge-pump voltage $V_{CHG}$ increases as long as the charge-pump switch S3 is open. The maximum charge-pump voltage $V_{CHG}$ accumulated during a switching cycle corresponds to the time interval of the body diode conduction. The charge-pump comparator 856 compares the charge pump voltage $V_{CHG}$ against a compensation reference voltage $V_{REF}$ to generate an up/down indication, which is provided to the up/down counter 858. At or near the end of each body diode conduction interval, the up/down counter increments its count according to the up/down indication from the charge-pump comparator 856. The reference voltage $V_{REF}$ corresponds to an optimal body diode conduction interval. Once the body diode conduction interval has converged upon its optimal value, the charge-pump comparator 856 will begin to toggle its up/down indication and the up/down counter 858 will output a count for each switching cycle that is toggling between adjacent values. The count generated by the up/down counter 858 is provided to the DAC 859, which sets the resistance of the variable resistor R4.

Figure 9:
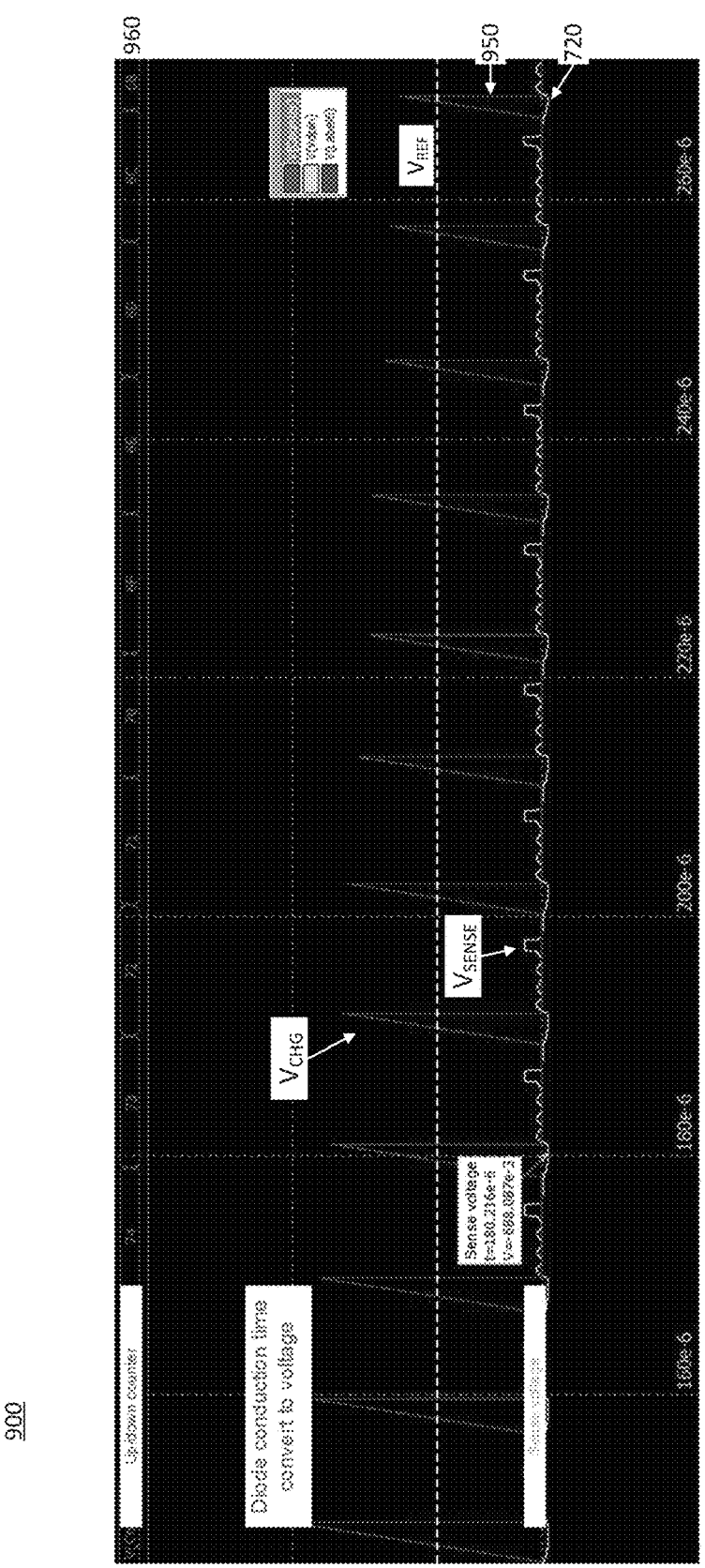
FIG. 9 illustrates voltage and current waveforms corresponding to the circuit of FIG. 8.

FIG. 9 illustrates waveforms corresponding to the turn-off trigger circuit 840 of FIG. 8. The waveform 720 corresponds to the voltage $V_{SENSE}$ at the first input 131, and is largely the same as the waveform 720 of FIG. 7. The charge-pump waveform 950 corresponds to the charge-pump voltage $V_{CHG}$, and can be seen to increase during each body diode conduction interval. The count value 960 corresponds to the output of the up/down counter 858, and can be seen to decrement by one for each switching cycle in FIG. 9. Note that the peak value for each triangular pulse of the charge voltage $V_{CHG}$ stays above the compensation reference voltage $V_{REF}$, which corresponds to the optimal body diode conduction interval, e.g, 200 ns. Later in time (which is not shown for ease of illustration), the peak values for the charge voltage $V_{CHG}$ will fall below the reference voltage $V_{REF}$. When this occurs, the count 960 will stop decrementing for each iteration, and will instead alternate between two adjacent count values, thereby indicating that the compensation has converged on a steady-state value corresponding to the optimal body diode conduction interval, e.g., 200 ns. As temperature or other factors alter the circuit characteristics, the compensation loop 850 may again ramp the count (up or down) provided by the up/down counter 858 until convergence is again achieved.

The variable resistance of the resistor R4 may be provided using various known techniques. For example, a transistor, e.g., a MOSFET, may be placed in series or in parallel with a fixed-value resistor, and a voltage or current, as provided by the DAC 859, at the transistor's control terminal, e.g., MOSFET gate, BJT base, may be altered to adjust the on-resistance of the transistor. For example, a MOSFET may be operated within its triode region wherein its on resistance varies approximately linearly. As another alternative, the DAC 859 may determine the current for a variable current source that injects additional current into a fixed resistor of the voltage divider.

Alternative Techniques for Controlling SR Switch

Figure 10:
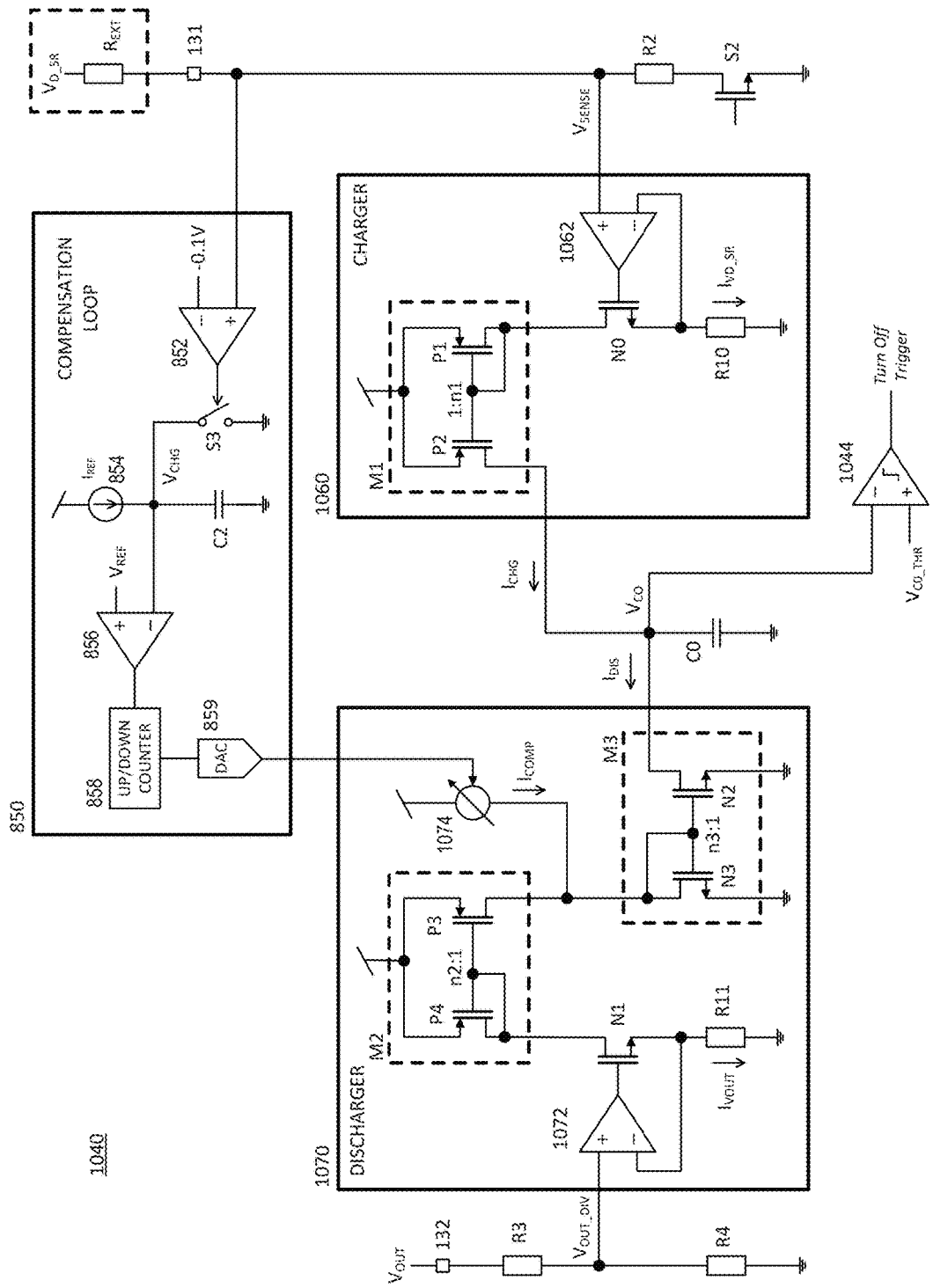
FIG. 10 illustrates a schematic diagram of a fifth turn-off trigger circuit, which uses the charge across a capacitor to generate a turn-off trigger for an SR switch.

FIG. 10 illustrates an alternative embodiment of a turn-off trigger circuit, such as the turn-off trigger circuit 240 shown in FIG. 2. Whereas the previously-described embodiments used an amplifier-based integrator to track a volt-second metric $V_{VS}$ based upon an integration of divided voltages, the turn-off trigger circuit 1040 of FIG. 10 uses a voltage built up on a charge capacitor C0 to effectively track a volt-second metric. Voltages corresponding to terminals of the secondary winding 124 are divided, using resistive voltage dividers, and converted into currents that charge and discharge the capacitor C0, thereby creating a voltage across the capacitor C0. This voltage may be used for triggering the turn off of the SR switch Q2. Circuitry that is not described in detail below is similar to that of FIG. 8.

The turn-off trigger circuit 1040 comprises first and second input terminals 131, 132, as did the previously-described circuits. Voltage dividers are used to reduce the voltages seen at these input terminals 131, 132, so that the turn-off circuit 1040 need not support excessively high input voltages. Internal resistors R3, R4 are used to divide the output voltage $V_{OUT}$ of a power converter, such as the power converter 100, thereby producing the reduced voltage $V_{OUT\_DIV}$. In conjunction with the external resistor $R_{EXT}$ and when switch S2 is closed (conducting), resistor R2 divides the drain voltage $V_{D\_SR}$ thereby yielding a reduced voltage $V_{SENSE}$. While the external resistor $R_{EXT}$ is shown in FIG. 10 for clarity of explanation, this resistor $R_{EXT}$ is external to the turn-off trigger circuit 1040, as indicated by the dotted box partitioning it from the other circuitry.

The turn-off trigger circuit 1040 further comprises a capacitor charging circuit 1060, a capacitor discharging circuit 1070, a compensation loop 850, and a comparator 1044. The charger 1060 converts the reduced drain voltage $V_{SENSE}$ into a current $I_{VD\_SR}$ corresponding to the drain voltage. This is achieved using a buffer (unity-gain amplifier) 1062 to replicate the voltage $V_{SENSE}$ across a resistor R10, so as to generate the current $I_{VD\_SR}=V_{SENSE}/R\mathbf{10}$. A current mirror M1 comprised of p-channel MOSFETs P1, P2 mirrors the current $I_{VD\_SR}$ to generate the charge current $I_{CHG}$, which, as illustrated, is related to the current $I_{VD\_SR}$ according to the current mirror transfer ratio 1:n1. The charge current $I_{CHG}$ charges the capacitor C0 thereby increasing the voltage $V_{C0}$ across it.

The metric needed by the turn-off trigger circuit 1040 corresponds to a voltage across the secondary winding 124 (or a similar winding or inductor), so the single-ended voltage $V_{D\_SR}$, and variants thereof including $I_{CHG}$, must be compared against some reference. This is accomplished by the discharging circuit 1070, which is configured similarly to the charger 1060 except that the discharger 1070 generates a discharge current $I_{DIS}$, which corresponds to the output voltage $V_{OUT}$. The output voltage $V_{OUT}$, and its corresponding discharge current $I_{DIS}$, serve as the reference for the voltage $V_{D\_SR}$, and its corresponding current $I_{CHG}$. A buffer (unity-gain amplifier) 1072 replicates the divided voltage $V_{OUT\_DIV}$ across a resistor R11, so as to generate the current $I_{VOUT}=V_{OUT\_DIV}/R\mathbf{11}$. This current $I_{VOUT}$ is replicated by the current mirror M2, which is comprised of p-channel MOSFETs P3 and P4 and has a transfer ratio of n2:1. The resultant current is then replicated by the current mirror M3, which is comprised of n-channel MOSFETs N2 and N3 and has a transfer ratio of n3:1, to generate the discharge current $I_{DIS}$. The discharge current $I_{DIS}$ is related to the divided output voltage $V_{OUT\_DIV}$ according to the resistor R11 and the transfer ratios n2 and n3. Other techniques for replicating current may be preferred in some applications, including techniques using mirrors based on other transistor types, such as bipolar-junction transistors (BJTs). The current transfer ratios n1, n2, n3 of the current mirrors may be used, in conjunction with the resistors R10, R11, to tune the voltage for the capacitor voltage $V_{C0}$ to an appropriate range supportable by the capacitor C0 and to a comparison threshold $V_{C0\_THR}$.

As with the volt-second metric described previously, the capacitor voltage $V_{C0}$ increases during a power interval, during which the drain voltage $V_{D\_SR}$ pulses high. Subsequent to the SR switch Q2 being turned on, the capacitor voltage $V_{C0}$ decreases until it falls to the threshold $V_{C0\_THR}$, at which point a comparator 1044 generates a turn-off trigger signal.

The turn-off trigger circuit 1040 may include a compensation loop 850, for optimizing a body diode conduction interval of the SR switch Q2. The compensation loop 850 is the same or similar to the compensation loop 850 of FIG. 8. The value generated by the DAC 859 is provided to a variable current source 1074 within the discharger 1070. A resultant compensation current $I_{COMP}$ is summed with the current from the current mirror M2 and provided to the current mirror M3, so as to adjust the discharge current $I_{DIS}$. The discharge current $I_{DIS}$ is adjusted until the body diode conduction reaches an optimal interval.

The switch S2 is opened while the compensation loop 850 is measuring the body diode conduction interval, as explained in conjunction with the switch S2 of FIG. 6. A reset switch, which is not shown for ease of illustration, may dump the charge from the capacitor C0 at the beginning of a switching cycle, in the same way as the switch S1 of FIG. 4.

While the above is described in the context of a flyback converter, it should be appreciated that isolated power converters having other topologies may use the above techniques. Regardless of the topology, the described turn-off trigger circuits may be coupled across one or more secondary windings of a transformer so as to generate a turn-off trigger for a secondary-side SR switch. In an additional application, the described turn-off trigger circuits could be coupled across the secondary portion of a tapped inductor within a resonant or semi-resonant power converter. In yet a further application, the described turn-off trigger circuits could be coupled across an energy-storage inductor within a non-isolated power converter, so as to generate a turn-off trigger for an SR switch used for rectifying the output voltage of, e.g., a non-isolated buck, boost, or buck-boost converter.

Method for Controlling SR Switch

Figure 11:
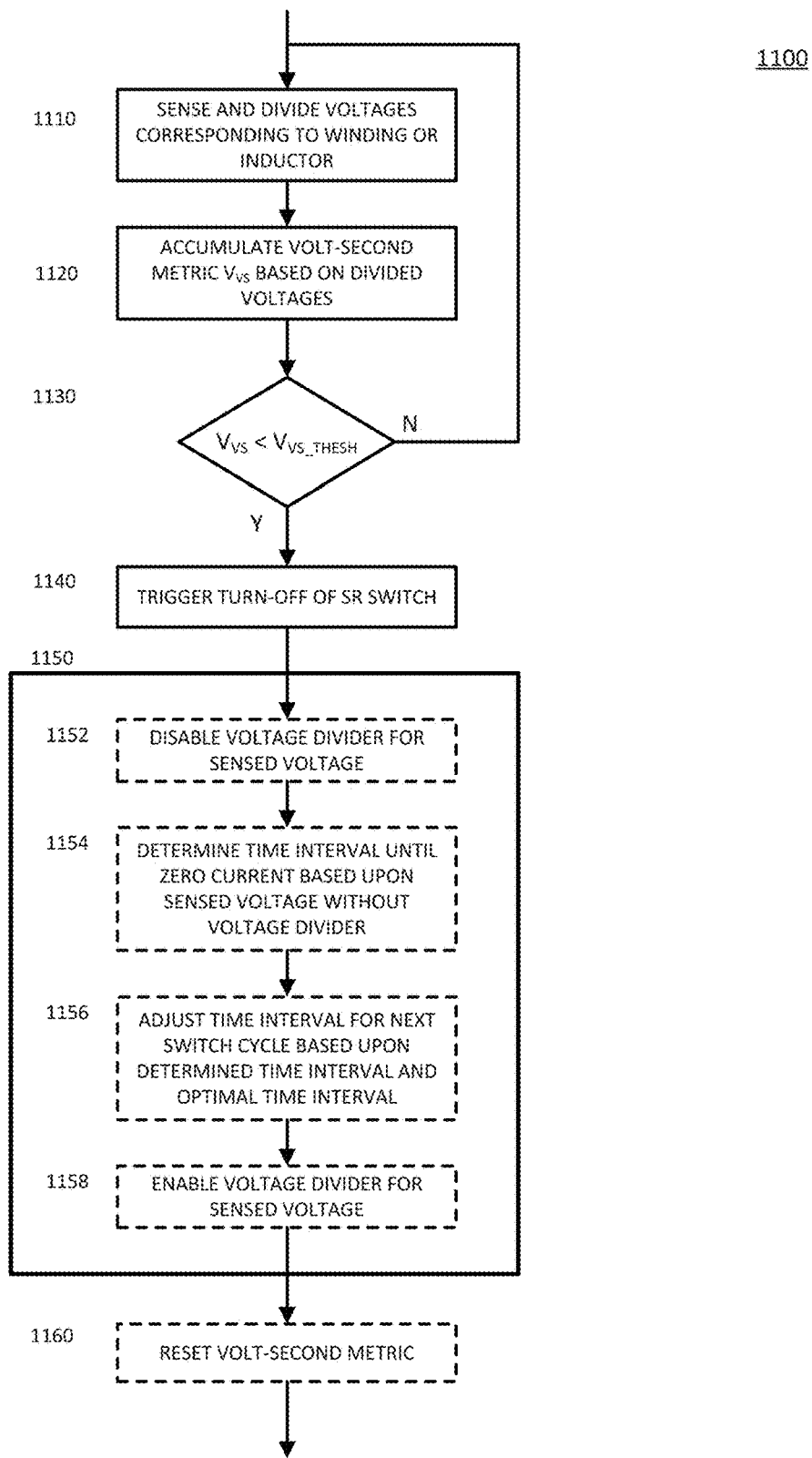
FIG. 11 illustrates a method for generating a turn-off trigger for an SR switch.

FIG. 11 illustrates a method 1100 for generating a turn-off trigger signal for an SR switch within a switched-mode power converter, such as the power converter 100 of FIG. 1. The method 1100 may be implemented within a turn-off trigger circuit, such as the circuits shown in FIGS. 2, 4, 6, 8, and 10. The method begins by dividing 1110 input voltages corresponding to voltages at terminals of a transformer winding or an energy-storage inductor of the power converter. A volt-second metric $V_{VS}$ is accumulated 1120 based upon the divided voltages, and the result is compared 1130 against a threshold $V_{VS\_THRESH}$. The volt-second metric $V_{VS}$ may correspond, e.g., to a voltage output from an integrating amplifier, such as the output of the amplifier 242 in FIG. 2, or may correspond to a voltage on a capacitor, such as the capacitor C0 in FIG. 10. Once the volt-second metric $V_{VS}$ reaches the threshold $V_{VS\_THRESH}$, a turn-off trigger signal is generated 1140.

An optional sequence of steps 1150 may make adjustments so as to drive a body diode conduction interval of the SR switch to a desired value, e.g., 200 ns. This optimization 1150 begins with a step of disabling 1152 a voltage divider for a sensed voltage. For example, a resistor divider for the drain voltage $V_{D\_SR}$ of an SR switch, as illustrated in FIG. 6, may be disabled, such that the undivided drain voltage $V_{D\_SR}$ is available for determining the body diode conduction interval. A time interval from the turn-off trigger signal until zero current flows through the SR switch is determined 1154, based upon the undivided sensed voltage. Adjustments are made so as to steer 1156 the time interval towards a desired value. Once the zero current condition is detected, the voltage divider for the sensed voltage is enabled 1158, in preparation for the next switching cycle of the power converter.

In an optional step 1160, the volt-second metric $V_{VS}$ is reset during the present switching cycle, so that practical effects, e.g., circuit inaccuracies, do not cause an undesired long-term drift in the accumulated volt-second metric $V_{VS}$. This reset is preferably performed in conjunction with detection of zero current through the SR switch.

According to an embodiment of a synchronous rectification (SR) controller, the SR controller is configured to control an SR switch of a switched-mode power converter having an output winding. The SR controller comprises first and second inputs, first and second voltage dividers, a volt-second determiner, and an SR switch turn-off signal generator. The first input is configured to sense a first voltage at a first terminal of the output winding, and the first voltage divider is configured to divide this first voltage, thereby providing a reduced first voltage. The second input is configured to sense a second voltage at a second terminal of the output winding, and the second voltage divider is configured to divide the second voltage, thereby providing a reduced second voltage. The volt-second determiner is configured to input the reduced first and second voltages, and provide a volt-second output based upon these reduced voltages. The resultant volt-second output tracks a winding current through the output winding. The SR switch turn-off signal generator is configured to generate an SR switch turn-off signal based upon the volt-second output and a first reference.

According to any embodiment of the SR controller, the volt-second determiner comprises an integration operational amplifier (op-amp), an integration capacitor coupling the volt-second output to a first input of the integration op-amp, and an integration resistor coupling the reduced first SR switch voltage to the first input of the integration op-amp. The volt-second determiner integrates a difference between the reduced first voltage and the reduced second voltage to provide the volt-second output.

According to any embodiment of the SR controller, the SR switch turn-off signal generator comprises a comparator configured to generate the SR switch turn-off signal based upon a comparison of the volt-second output and the first reference, and the first reference is based on the reduced second voltage.

According to any embodiment of the SR controller, the SR controller further includes a first switch configured to reset the volt-second output.

According to any embodiment of the SR controller, the SR controller further includes a compensation loop configured to adjust timing of the SR turn-off signal by applying a compensation that alters the second reduced voltage from the second voltage divider. The compensation is updated during a time interval when the first voltage divider is disabled.

In a further variation to this embodiment, the compensation loop comprises a compensation capacitor having a compensation capacitor voltage and a compensation current source configured to charge the compensation capacitor. A first compensation comparator compares the first voltage with a first compensation reference voltage. A third switch is turned on and discharges the compensation capacitor based on an output of the first compensation comparator. A second compensation comparator compares the compensation capacitor voltage with a second compensation reference voltage, and provides its result to a counter at the counter's up/down control input. A count generated by the counter is provided to a digital to analog converter (DAC), which provides an analog signal that controls a variable component within the second voltage divider.

In a variation of this embodiment, the variable component is a variable current source configured to provide a variable current based upon the analog DAC output. The variable current generates a voltage offset for the reduced second output voltage.

According to any embodiment of the SR controller, the volt-second determiner comprises a volt-second capacitor, a charging circuit configured to source a charging current to the volt-second capacitor based upon the first reduced voltage, and a discharging circuit configured to sink a discharging current from the volt-second capacitor based upon the second reduced voltage. The volt-second output of the volt-second determiner corresponds to a voltage across the volt-second capacitor.

According to any embodiment of the SR controller, the first voltage divider comprises an internal resistor that is configured to provide the reduced first voltage in conjunction with an external resistor that is coupled to the first input and that is external to the SR controller.

According to a method within a synchronous rectification (SR) controller of a switched-mode power converter having an output winding, the method is for controlling an SR switch that controls current flow through the output winding so as to rectify an output voltage of the power converter. The method comprises sensing a first voltage at a first terminal of the output winding, and dividing this first voltage to provide a reduced first voltage. The method further comprises sensing a second voltage at a second terminal of the output winding, and dividing this second voltage to provide a reduced second voltage. A difference between the reduced first and second voltages is integrated, thereby providing a volt-second output that corresponds to a current through the output winding. The volt-second output is compared against a first reference and, based upon this comparison, an SR switch turn-off signal is generated.

According to any embodiment of the method, the method further includes adding a voltage offset to the divided second voltage to provide the first reference.

According to any embodiment of the method, the method further includes resetting the volt-second output at a start of each switching cycle of the power converter.

According to any embodiment of the method, the first voltage divider is disabled in conjunction with the generating of the SR switch turn-off signal.

In a variant of this method, the method further comprises adjusting, subsequent to the disabling of the first voltage divider, a timing of the SR turn-off signal by applying a compensation that alters the reduced second voltage.

In a variant of this method, applying the compensation comprises incrementing or decrementing a count, and adjusting the dividing of the second voltage based upon this count.

In a further variant of this method, applying the compensation comprises comparing the first voltage, which is not reduced by the first voltage divider, with a first compensation reference voltage, measuring a time interval during which the first voltage exceeds the first compensation reference voltage, and, responsive to detecting that the time interval exceeds a target time interval, incrementing the count such that the applied compensation reduces the voltage output from the second voltage divider. This technique may further include the step of decrementing, responsive to detecting that the time interval is less than the target time interval, the count such that the applied compensation increases the voltage output from the second voltage divider.

In another variant of the method that includes adjusting the SR signal turn-off timing, the adjusting is performed by providing a variable current from a variable current source, wherein the variable current is determined based on the count.

According to an embodiment of an isolated switched-mode power converter, the power converter comprises a transformer having primary and secondary windings, and which separates primary and secondary sides of the power converter. The power converter further comprises a synchronous rectification (SR) switch, and an SR controller for controlling conductivity of the SR switch. The SR switch is configured to rectify an output voltage of the secondary side by controlling current flow through the secondary winding. The SR controller comprises first and second inputs, first and second voltage dividers, a volt-second determiner, and an SR switch turn-off generator. The first input is for sensing an SR switch voltage at a first terminal of the SR switch, and the first voltage divider is for dividing this voltage, thereby providing a reduced SR switch voltage. The second input is for sensing the output voltage of the power converter, and the second voltage divider is for dividing this voltage, thereby providing a reduced output voltage. The volt-second determiner is configured to input the reduced SR switch and output voltages, and to provide a volt-second output based upon a difference between these reduced voltages. The resultant volt-second output corresponds to a current through the secondary winding. The SR switch turn-off signal generator is configured to generate an SR switch turn-off signal based upon the volt-second output and a first reference.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A synchronous rectification (SR) controller for controlling an SR switch of a switched-mode power converter having an output winding, the SR controller comprising:
    a first input for sensing a first voltage at a first terminal of the output winding;
    a first voltage divider for reducing the first voltage, thereby providing a reduced first voltage;
    a second input for sensing a second voltage at a second terminal of the output winding;
    a second voltage divider for reducing the second voltage, thereby providing a reduced second voltage;
    a volt-second determiner configured to input the reduced first voltage and the reduced second voltage, and provide a volt-second output based upon the reduced first and second voltages, wherein the volt-second output corresponds to a winding current through the output winding; and
    an SR switch turn-off signal generator configured to generate an SR switch turn-off signal based upon the volt-second output and a first reference.

2. The SR controller of claim 1, wherein the volt-second determiner comprises:
    an integration operational amplifier (op-amp);
    an integration capacitor coupling the volt-second output to a first input of the integration op-amp; and
    an integration resistor coupling the reduced first voltage to the first input of the integration op-amp,
    wherein the volt-second determiner integrates a difference between the reduced first voltage and the reduced second voltage to provide the volt-second output.

3. The SR controller of claim 1,
    wherein the SR switch turn-off signal generator comprises a comparator configured to generate the SR switch turn-off signal based upon a comparison of the volt-second output and the first reference, and
    wherein the first reference is based on the reduced second voltage.

4. The SR controller of claim 1, further comprising:
    a first switch configured to reset the volt-second output.

5. The SR controller of claim 1, further comprising:
    a second switch configured to disable the first voltage divider; and
    a buffer interposed between the first input and an input of the volt-second determiner,
    wherein a voltage at the first input is not reduced when the first voltage divider is disabled.

6. The SR controller of claim 5, further comprising:
    a compensation loop configured to adjust timing of the SR turn-off signal by applying a compensation that alters the second reduced voltage,
    wherein the compensation is updated during a time interval when the first voltage divider is disabled.

7. The SR controller of claim 6, wherein the compensation loop comprises:
    a compensation capacitor having a compensation capacitor voltage;
    a compensation current source configured to charge the compensation capacitor;
    a first compensation comparator for comparing the first voltage with a first compensation reference voltage;
    a third switch configured to be turned on and discharge the compensation capacitor based on an output of the first compensation comparator;
    a second compensation comparator for comparing the compensation capacitor voltage with a second compensation reference voltage;
    a counter having an up/down control input coupled to an output of the second compensation comparator and configured to provide a count; and
    a digital to analog converter (DAC) having an input coupled to the counter and that generates an analog DAC output based on the count,
    wherein the second voltage divider includes a variable component whose value is set by the analog DAC output.

8. The SR controller of claim 7,
    wherein the variable component is a variable current source configured to provide a variable current based upon the analog DAC output, and
    wherein the variable current provides a voltage offset to the reduced second voltage.

9. The SR controller of claim 1, wherein the volt-second determiner comprises:
    a volt-second capacitor;
    a charging circuit configured to source a charging current to the volt-second capacitor, the charging current based upon the first reduced voltage; and
    a discharging circuit configured to sink a discharging current from the volt-second capacitor, the discharging current based upon the second reduced voltage,
    wherein the volt-second output of the volt-second determiner corresponds to a voltage across the volt-second capacitor.

10. The SR controller of claim 1, wherein the first voltage divider comprises an internal resistor that is configured to provide the reduced first voltage in conjunction with an external resistor that is coupled to the first input and that is external to the SR controller.

11. A method for controlling a synchronous rectification (SR) switch of a switched-mode power converter having an output winding, the method comprising:

sensing a first voltage at a first terminal of the output winding;

dividing the first voltage, thereby providing a reduced first voltage;

sensing a second voltage at a second terminal of the output winding;

dividing the second voltage, thereby providing a reduced second voltage;

integrating a difference between the reduced first voltage and the reduced second voltage, thereby providing a volt-second output that corresponds to a winding current through the output winding;

comparing the volt-second output with a first reference; and generating an SR switch turn-off signal based upon said comparing.

12. The method of claim 11, further comprising:

adding a voltage offset to the divided second voltage to provide the first reference.

13. The method of claim 11, further comprising:

resetting the volt-second output at a start of each switching cycle of the power converter.

14. The method of claim 11, wherein the first voltage divider is disabled in conjunction with the generating of the SR switch turn-off signal.

15. The method of claim 14, further comprising:

subsequent to the disabling of the first voltage divider, adjusting a timing of the SR turn-off signal by applying a compensation that alters the reduced second voltage.

16. The method of claim 15, wherein applying the compensation comprises:

incrementing or decrementing a count; and adjusting the dividing of the second voltage based upon the count.

17. The method of claim 16, wherein applying the compensation further comprises:

comparing the first voltage, which is not reduced by the first voltage divider, with a first compensation reference voltage;

measuring a time interval during which the first voltage exceeds the first compensation reference voltage; and responsive to detecting that the time interval exceeds a target time interval, incrementing the count such that the applied compensation reduces the voltage output from the second voltage divider.

18. The method of claim 17, wherein applying the compensation further comprising:

responsive to detecting that the time interval is less than the target time interval, decrementing the count such that the applied compensation increases the voltage output from the second voltage divider.

19. The method of claim 16, wherein the adjusting comprises:

providing a variable current from a variable current source, wherein the variable current is determined based on the count.

20. An isolated switched-mode power converter, comprising:

a primary side;

a secondary side providing an output voltage of the power converter;

a transformer separating the primary and secondary sides and comprising a primary winding and a secondary winding;

a synchronous rectification (SR) switch comprising a first terminal coupled to the secondary winding, a second terminal, and a control terminal, the control terminal configured to control conductivity between the first and second terminals;

an SR controller, comprising:

a first input for sensing an SR switch voltage at the first terminal of the SR switch;

a first voltage divider for reducing a voltage at the first input, thereby providing a reduced SR switch voltage;

a second input for sensing the output voltage;

a second voltage divider for reducing a voltage at the second input, thereby providing a reduced output voltage;

a volt-second determiner configured to input the reduced output voltage and the reduced SR switch voltage, and provide a volt-second output based upon the reduced output and SR switch voltages, wherein the volt-second output corresponds to a current through the secondary winding; and an SR switch turn-off generator configured to generate an SR switch turn-off signal based upon the volt-second output and a first reference.

* * * * *